May 10, 1938.  C. L. EKSERGIAN  2,116,598
VEHICLE WHEEL
Filed May 29, 1930

INVENTOR:
Carolus L. Eksergian,
BY
ATTORNEY.

Patented May 10, 1938

2,116,598

UNITED STATES PATENT OFFICE 2,116,598

VEHICLE WHEEL

Carolus L. Eksergian, Detroit, Mich., assignor to Budd Wheel Company, Philadelphia, Pa., a corporation of Pennsylvania Application May 29, 1930, Serial No. 457,092

4 Claims. (Cl. 301—9)

My invention relates to the art of metal vehicle wheels and it has been my object to produce a wheel of this type having a spoked effect from a minimum amount of metal having reinforcements at its weakest points. It has been a further object of my invention to provide a strong and adequate securing means adjacent the center of such a wheel, whereby to lock it in position relatively to the hub.

To this end I have produced a wheel having two plies of metal in the nave portion thereof and only a single ply in the outer peripheral portion.

Other objects of my invention and the manner in which I have obtained them will be obvious to those skilled in the art upon a reading of the sub-joined specification in the light of the attached drawing in which, Fig. 1 is a sectional view illustrating the construction of my improved wheel and the manner of its attachment to a hub and brake drum.

Figure 1:
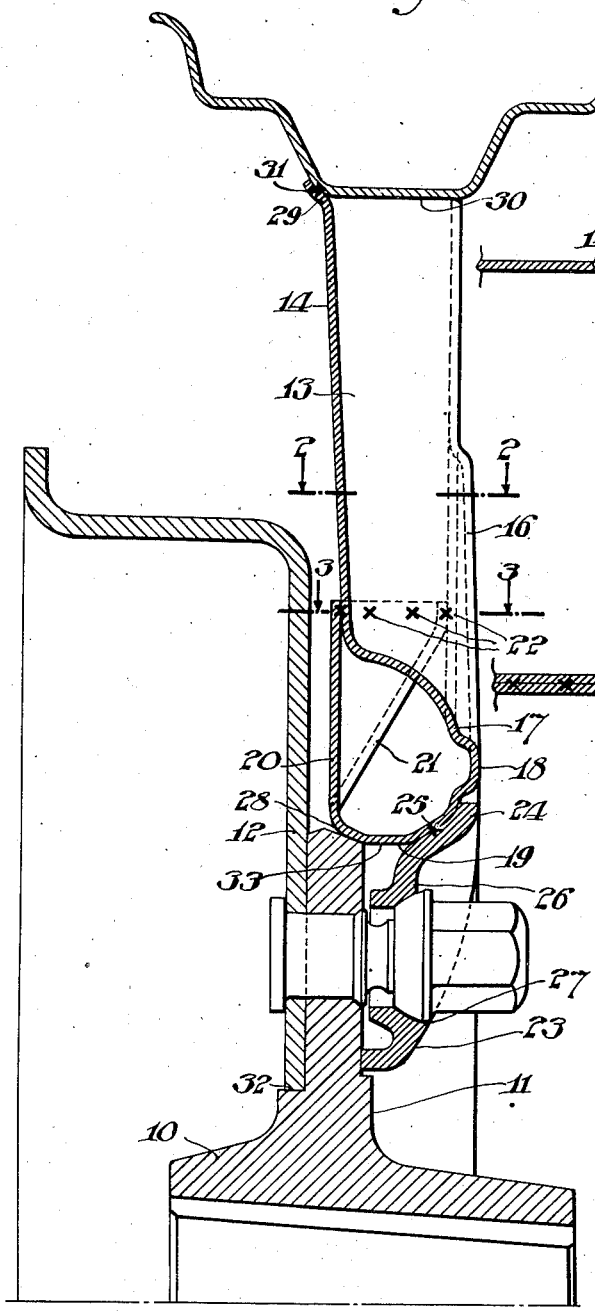
Figure 2:
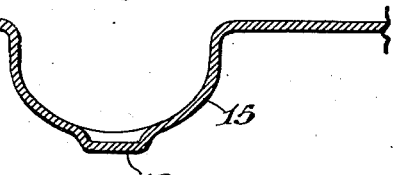
Fig. 2 is a cross section on the line 2—2 of Fig. 1.
Figure 3:
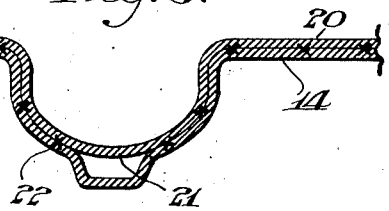
Fig. 3 is a cross section on the line 3—3 of Fig. 1.

Referring to the drawing by reference characters, the numeral 10 designates the hub of a vehicle having a flange 11 to which the brake drum 12 and wheel 13 are secured, the brake drum seating against a shoulder 32 on the inner side of the hub flange, while the wheel proper seats against the inclined outer peripheral extremity 28 of the flange 11. The wheel 13 consists of a main body portion 14 having portions 15 pressed outwardly therefrom in the form of spokes to simulate an artillery wheel. The inner radial portions of these spokes are ribbed as indicated at 16. The inner radial portion of the main body of the wheel is pressed outwardly as indicated at 17, and provided with an annular rib 18 comprising the front of the nave portion of the wheel. This nave portion is turned inwardly and reversely curved upon itself as indicated at 19 and 20. Portions of the reversely curved back of the wheel are pressed outwardly, as shown at 21, complementally to the spoke portions of the wheel to nest in these spoke portions, as indicated at 21 in the drawing. The main body of the reversely curved portion of the wheel abuts the main body 14 of the wheel and the spokes of this reversely curved portion nest within the spokes of the wheel, both the spokes and the main body being welded together, as indicated at 22. As previously explained, this wheel body seats against the outer edge 28 of the flange of the hub and thus does not extend inwardly to the circle formed by the securing means.

An annular bolting-on flange 23 serves to secure the wheel in place on the hub flange, and is provided with the flange 24 which overlaps the nave portion of the wheel and is welded thereto, as indicated at 25. The bolting-on-flange is provided with an inwardly offset portion, as indicated at 26, and a seat 27 for the securing nut. The annular bolting-on-flange is formed of relatively thick metal and a very strong and rigid wheel is thus obtained in the neighborhood of the securing nuts.

The outer peripheral extremity of the wheel is somewhat longer in the neighborhood of the flat main body portion 14 than in the neighborhood of the spokes 15, and the main body portion is offset to provide a flange 29. A rim, which in the illustration is of the drop center type, may be seated upon the spokes at 30 and secured to the flange of the wheel proper by any suitable means. In the drawing, these parts are shown spot welded together at 31. My improved wheel thus serves as a combinded wheel and felloe.

The reversely curved portion 20 may be formed integrally with the main body 14 of the wheel or it may be formed in a separate piece and integrally welded thereto at a suitable point such, for example, as the axial center of the nave of the wheel, as indicated at 33.

The advantages of my wheel should be obvious from a reading of the above specification. Wheels of this general type have an unfortunate tendency to fail in their nave portions, and particularly, in the direct neighborhood of the bolt holes. For this reason I have substituted a very heavy and strong annulus for the portion of the wheel which normally surrounds the bolt holes. I have also provided a reinforced wheel beyond this point by reason of the reversely curved portions 20 and 21 of the nave without sacrificing the desired resiliency in the spoked portions proper. I have also produced a wheel of a pleasing ornamental appearance, due to the simulation of a spoked wheel and one which is capable of attractive variations of design by reason of the flat background 14 provided for these spoked-simulating portions.

Modifications will be obvious to those skilled in the art and I do not, therefore, wish to be limited except by the generic spirit of my invention as interpreted in the light of prior art and my sub-joined claims.

What I claim is:

1. A vehicle wheel comprising a single disc spider member comprising radially extending spoke portions of channel section, an angularly extending nave portion, said spokes having their root portions pressed from said nave portion and being of increasing channel depth radially outwardly, said nave portion terminating radially inwardly in a substantially annular portion, and webs interconnecting the side walls of said spokes, an annulus secured to the radially inward annular portion of said disc body providing a bolting-on flange for said disc wheel body, and an annulus homogeneously united with the radially innermost portion of said disc body and secured to said disc body adjacent the periphery of the nave portion thereof, whereby to provide a substantially annular hollow box section nave outwardly of the bolting-on flange.

2. A vehicle wheel comprising a single disc spider member comprising radially extending spoke portions of channel section, an angularly extending nave portion, said spokes having their root portions pressed from said nave portion and being of increasing channel depth radially outwardly, said nave portion terminating radially inwardly in a substantially annular portion, and webs interconnecting the side walls of said spokes and forming outer continuations of said nave periphery, an annulus secured to the radiallly inward annular portion of said disc body providing a bolting-on flange for said disc wheel body, and an annulus homogeneously united with the radially innermost portion of said disc body and secured to said disc body adjacent the periphery of the nave portion thereof, whereby to provide a substantially annular hollow box section nave outwardly of the bolting-on flange, said annulus being peripherally of axially corrugated contour whereby to provide interlocking complemental securement with the spoke formations in the zone of the nave periphery.

3. A pressed metal wheel body of the demountable bolted-on type comprising a bolting-on flange, a main stamping supported thereby and formed immediately radially outwardly of the bolting-on flange with an annular rearwardly facing channel, and a reinforcing annulus connected between the channel walls and forming therewith a box section, the main stamping radially outwardly of the channel constituting the entire depth of the wheel body, the outer wall of the channel having corrugations and the periphery of the reinforcing plate being corrugated to interfit therewith.

4. A pressed metal wheel of the demountable bolted-on type comprising a main stamping having spokes, a conical nave from which the roots of the spokes are pressed, and an annular axial extension of said nave combining with the nave to form an annular axially-facing channel, a single bolting-on flange extending radially inwardly from said annular extension of the nave, and an annular reinforcing plate bridging the channel, secured to the main stamping at the outer periphery of the nave and having its inner edge secured to the axially innermost portion of said annular extension, the outer periphery of the reinforcing plate being formed to interfit with the spokes of the main stamping, said main stamping comprising the full depth of the wheel body in the zone of the spokes.

CAROLUS L. EKSERGIAN.